(12) United States Patent
Karczewicz et al.

(10) Patent No.: US 8,804,831 B2
(45) Date of Patent: Aug. 12, 2014

(54) OFFSETS AT SUB-PIXEL RESOLUTION

(75) Inventors: Marta Karczewicz, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 392 days.

(21) Appl. No.: 12/420,280

(22) Filed: Apr. 8, 2009

(65) Prior Publication Data

US 2009/0257500 A1    Oct. 15, 2009

Related U.S. Application Data

(60) Provisional application No. 61/044,240, filed on Apr. 11, 2008, provisional application No. 61/044,023, filed on Apr. 10, 2008, provisional application No. 61/044,020, filed on Apr. 10, 2008.

(51) Int. Cl.
  *H04N 7/12*  (2006.01)
  *H04N 11/02* (2006.01)
  *H04N 7/36*  (2006.01)
  *H04N 7/26*  (2006.01)

(52) U.S. Cl.
  CPC ......... *H04N 19/00739* (2013.01); *H04N 7/364* (2013.01); *H04N 19/0063* (2013.01); *H04N 7/26808* (2013.01); *H04N 19/0089* (2013.01)
  USPC .................. 375/240.16; 375/240.17

(58) Field of Classification Search
  CPC .............. H04N 7/26808; H04N 7/364; H04N 19/0063; H04N 19/00739; H04N 19/0089
  USPC ......................................... 375/240
  See application file for complete search history.

(56) References Cited

U.S. PATENT DOCUMENTS

| | | |
|---|---|---|
| 6,529,638 B1 | 3/2003 | Westerman |
| 6,539,058 B1 | 3/2003 | Pearlstein et al. |

(Continued)

FOREIGN PATENT DOCUMENTS

| | | |
|---|---|---|
| CN | 1671209 A | 9/2005 |
| CN | 1717056 A | 1/2006 |

(Continued)

OTHER PUBLICATIONS

"Golomb coding" (Wikipedia).*

(Continued)

*Primary Examiner* — Sath V Perungavoor
*Assistant Examiner* — Xiaolan Xu
(74) *Attorney, Agent, or Firm* — Todd E. Marlette

(57) ABSTRACT

This disclosure describes techniques applied during video encoding and decoding processes. In one example, a method of encoding video data comprises calculating a plurality of offset values for a coded unit of the video data, wherein the offset values are associated with a plurality of different integer and sub-integer pixel locations, applying the offset values to predictive video blocks to generate offset predictive video blocks, and encoding video blocks of the coded unit based on the offset predictive video blocks. In another example, a method of decoding video data comprises receiving a plurality of offset values for a coded unit of the video data, wherein the offset values are associated with a plurality of different integer and sub-integer pixel locations, applying the offset values to predictive video blocks to generate offset predictive video blocks, and decoding video blocks of the coded unit based on the offset predictive video blocks.

39 Claims, 7 Drawing Sheets

(56) References Cited

U.S. PATENT DOCUMENTS

| | | | |
|---|---|---|---|
| 7,129,962 | B1 | 10/2006 | Cote et al. |
| 2003/0103680 | A1 | 6/2003 | Westerman |
| 2003/0194011 | A1 | 10/2003 | Srinivasan |
| 2003/0202607 | A1 | 10/2003 | Srinivasan |
| 2004/0076333 | A1 | 4/2004 | Zhang et al. |
| 2004/0114688 | A1 | 6/2004 | Kang |
| 2004/0161035 | A1 | 8/2004 | Wedi |
| 2005/0053143 | A1* | 3/2005 | Holcomb et al. ........ 375/240.16 |
| 2005/0117810 | A1 | 6/2005 | Bjontegaard et al. |
| 2005/0207496 | A1 | 9/2005 | Komiya et al. |
| 2006/0108654 | A1 | 5/2006 | Mueller |
| 2006/0133506 | A1 | 6/2006 | Dang |
| 2008/0037656 | A1 | 2/2008 | Hannuksela |
| 2008/0247467 | A1* | 10/2008 | Rusanovskyy et al. .. 375/240.16 |
| 2008/0253459 | A1 | 10/2008 | Ugur et al. |
| 2009/0257499 | A1 | 10/2009 | Karczewicz et al. |

FOREIGN PATENT DOCUMENTS

| | | | |
|---|---|---|---|
| CN | 1738435 | A | 2/2006 |
| EP | 1432249 | A1 | 6/2004 |
| EP | 1617672 | | 1/2006 |
| JP | 10136385 | A | 5/1998 |
| JP | 2000106675 | A | 4/2000 |
| JP | 2003333599 | | 11/2003 |
| JP | 2004007377 | A | 1/2004 |
| JP | 2004007379 | A | 1/2004 |
| JP | 2004147328 | A | 5/2004 |
| JP | 2005501442 | A | 1/2005 |
| JP | 2005533466 | A | 11/2005 |
| JP | 2005533467 | A | 11/2005 |
| KR | 20050018948 | A | 2/2005 |
| KR | 100681971 | B1 | 2/2007 |
| KR | 1020070045662 | A | 5/2007 |
| RU | 2302707 | C2 | 7/2007 |
| RU | 2305377 | C2 | 8/2007 |
| RU | 2317654 | C2 | 2/2008 |
| WO | 02089063 | A2 | 11/2002 |
| WO | WO03047270 | A1 | 6/2003 |
| WO | WO-2004017157 | A2 | 2/2004 |
| WO | 2005004492 | | 1/2005 |
| WO | WO2005104564 | A1 | 11/2005 |
| WO | 2006033953 | | 3/2006 |
| WO | WO-2006076602 | A1 | 7/2006 |
| WO | WO2006108654 | A2 | 10/2006 |
| WO | WO-2007009875 | A2 | 1/2007 |
| WO | 2007094792 | | 8/2007 |
| WO | WO-2008084378 | A2 | 7/2008 |

OTHER PUBLICATIONS

Miyamoto: "Adaptive Motion Interpolation on MB-basis" Joint Video Team (JVT) of ISO/IEC MPEG & ITU-T VCEG(ISO/IEC JTC1/SC29/WG11 and ITU-T SG16 Q6), XX, XX, No. JVT-C040, May 10, 2002, XP030005148.

Srinivasan S et al: "An overview of VC-1" Visual Communications and Image Processing; Jul. 12, 2005-Jul. 15, 2005, Beijing, Jul. 12, 2005, XP030080912.

Ye Y et al: "High precision interpolation and prediction" 35. VCEG Meeting; 85. MPEG Meeting; Jul. 16, 2008-Jul. 18, 2008, Berlin, (Video Coding Experts Group of ITU-T SG.16), Jul. 12, 2008, XP030003598.

International Search Report—PCT/US09/040278, International Search Authority—European Patent Office—Jul. 14, 2009.

Written Opinion—PCT/US09/040278, International Search Authority—European Patent Office—Jul. 14, 2009.

& Wedi: :New Results on Adaptive Interpolation Filter Joint Video (ISO/IEC JTC1/SC29/WG11 and ITU-T SG16 Q6), XX, XX, No. JVT-C059, May 10, 2002, XP030005168.

Boyce J M: "Weighted prediction of the H.264/MPEG AVC video coding standard" Circuits and Systems, 2004. ISCAS '04. Proceedings of the 2004 International Symposium on Vancouver, BC, Canada May 23-26, 2004, pp. III-789, XP010719383.

Wiegand T et al: "Overview of the H.264/AVC video coding standard" IEEE Transactions on Circuits and Systems for Video Technology, IEEE Service Center, Piscataway, NJ, US, vol. 13, No. 7, Jul. 1, 2003, pp. 560-576, XP011099249.

Ravi Krishnamurthy et al: "Frame Interpolation and Bidirectional Prediction of Video Using Compactly Encoded Optical-Flow Fields and Label Fields" IEEE Transactions on Circuits and Systems for Video Technology, IEEE Service Center, Piscataway, NJ, US, vol. 9, No. 5, Aug. 1, 1999, XP011014592.

Peng Yin et al: "Localized Weighted Prediction for Video Coding" IEEE, May 23, 2005, pp. 4365-4368, XP010816640.

Yanfei Shen et al: "Adaptive weighted prediction in video coding" Multimedia and EXPO, 2004. ICME '04. 2004 IEEE International Conference on, IEEE, Piscataway, NJ, USA, vol. 1, Jun. 27, 2004, pp. 427-430, XP010770802.

Qualcomm: Switched Interpolation Filter with Offset ITU-T SG16/Q. DOC. T05-SG1-C 463-E, International Telecommunication Union, Geneva, CH, Apr. 14, 2008, pp. 1-4, XP007908845.

Y. Vatis and J. Ostermann, "Comparison of Complexity Between Two-Dimensional Non-Separable Adaptive Interpolation Filter and Standard Wiener Filter," ITU-T SGI 6/Q.6 Doc. VCEG-AA11, Nice, France, Oct. 2005.

S. Wittmann, T. Wedi, "Separable Adaptive Interpolation Filter," ITU-T SG 16/Q.6 Doc. T05-SG16-C-0219, Geneva, Switzerland, Jun. 2007.

D. Rusanovskyy, K. Ugur, J. Lainema, "Adaptive Interpolation with Directional Filters," ITU-T SGI 6/Q.6 Doc. VCEG-AG21, Shenzhen, China.

T. Jung and G Laroche, "Performance Evaluation of the KTA 1.2 Software," ITU-T SG16/Q.6 VCEG, VCEG-AE09, Marrakech, Morocco, Jan. 2007.

International Search Report—PCT/US09/040279, International Search Authority—European Patent Office—Jul. 14, 2009.

Written Opinion—PCT/US09/040279, International Search Authority—European Patent Office—Jul. 14, 2009.

Thomas Wedi, "Adaptive Interpolation Filter for Motion Compensated Prediction", Proc. IEEE International Conference on Image Processing (ICIP), New York, Sep. 2002.

Chono et al., "Adaptive motion interpolation on MB basis", Joint Video Team (JVT) of ISO/IEC MPEG & ITU-T VCEG (ISO/IEC JTC1/SC29/WG11 and ITU-T SG16 Q.6), 3rd Meeting: Fairfax, Virginia, USA, May 2002, JVT-C040, pp. 1-18.

Taiwan Search Report—TW098112142—TIPO—Jan. 9, 2014.

Vatis Y., Syntax of adaptive filter coefficients in the KTA reference model, ITU—Telecommunications Standardization Sector Study Group 16 Question 6, Video Coding Experts Group (VCEG), VCEG-AF09, San Jose, Apr. 20-21, 2007.

* cited by examiner

OFFSETS AT SUB-PIXEL RESOLUTION

This application claims the benefit of U.S. Provisional Application Nos. 61/044,240 filed on Apr. 11, 2008, 61/044,023 filed on Apr. 10, 2008, and 61/044,020 filed on Apr. 10, 2008, the entire contents all of which are incorporated herein by reference.

TECHNICAL FIELD

This disclosure relates to digital video coding and, more particularly, techniques in which offsets are applied to predictive data used in the video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as those described in standards defined by MPEG-2, MPEG-4, or ITU-T H.264/MPEG-4, Part 10, Advanced Video Coding (AVC), to transmit and receive digital video information more efficiently. Video compression techniques may perform spatial prediction and/or temporal prediction to reduce or remove redundancy inherent in video sequences.

Block based inter-coding is a very useful coding technique that relies on temporal prediction to reduce or remove temporal redundancy between video blocks of successive coded units of a video sequence. The coded units may comprise video frames, slices of video frames, groups of pictures, or another defined unit of video blocks. For inter-coding, the video encoder performs motion estimation and motion compensation to track the movement of corresponding video blocks of two or more adjacent coded units. Motion estimation generates motion vectors, which indicate the displacement of video blocks relative to corresponding prediction video blocks in one or more reference frames or other coded units. Motion compensation uses the motion vectors to generate prediction video blocks from the reference frame or other coded unit. After motion compensation, residual video blocks are formed by subtracting prediction video blocks from the original video blocks being coded.

The video encoder may also apply transform, quantization and entropy coding processes to further reduce the bit rate associated with communication of residual blocks. Transform techniques may comprise discrete cosine transforms (DCTs) or conceptually similar processes. Alternatively, wavelet transforms, integer transforms, or other types of transforms may be used. In a DCT process, as an example, a set of pixel values are converted into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients. Examples of entropy coding include but are not limited to content adaptive variable length coding (CAVLC) and context adaptive binary arithmetic coding (CABAC).

A coded video block may be represented by prediction information that can be used to create or identify a predictive block, and a residual block of data indicative of differences between the block being coded and the predictive block. The prediction information may comprise the one or more motion vectors that are used to identify the predictive block of data. Given the motion vectors, the decoder is able to reconstruct the predictive blocks that were used to code the residual. Thus, given a set of residual blocks and a set of motion vectors (and possibly some additional syntax), the decoder may be able to reconstruct a video frame that was originally encoded. Inter-coding based on motion estimation and motion compensation can achieve very good compression because successive video frames or other types of coded units are often very similar. An encoded video sequence may comprise blocks of residual data, motion vectors, and possibly other types of syntax.

Interpolation and extrapolation techniques have been developed in order to improve the level of compression that can be achieved in inter-coding. In this case, the predictive data generated during motion compensation, which is used to code a video block, may be interpolated or extrapolated from the pixels of video blocks of the video frame or other coded unit used in motion estimation. Interpolation or extrapolation is often performed to generate predictive half pixel values (half-pel) and predictive quarter pixel values (quarter-pel). Such interpolation or extrapolation often generates predictive blocks that are even more similar to the video blocks being coded than the actual video blocks of the predictive frame or other coded unit used in the video coding.

SUMMARY

In general, this disclosure describes techniques applied by an encoder and a decoder during video encoding and decoding processes. According to the techniques, an encoder generates a plurality of offset values for each coded unit, and the offset values are applied to predictive data that is used to code the video blocks of the coded unit. In particular, different offset values may be defined for each integer and sub-integer pixel location associated with the coded unit. The sub-integer pixel locations may correspond to interpolated or extrapolated data, which is interpolated or extrapolated based on the data at integer pixel locations. By accounting for different offsets at different pixel locations (an integer pixel location and various sub-integer pixel locations), the resultant offset predictive data may provide for better compression than the original predictive data. In this way, the techniques of this disclosure may improve video coding.

The encoder may encode the different offset values for each coded unit, which may then be communicated to a decoder as part of an encoded bitstream. In this manner, the decoder may receive the different offset values defined at the encoder for each coded unit. Accordingly, the decoder can generate predictive data, and then reconstruct the offset predictive data based on the predictive data and the offset values. Video data of the coded unit, e.g., video blocks, can then be decoded based on the offset predictive data. By providing separate offset values for different integer and sub-integer pixel locations associated with a coded unit, coding may be improved relative to techniques that apply a single offset value to a coded unit.

In one example, this disclosure provides a method of encoding video data. The method comprises calculating a plurality of offset values for a coded unit of the video data, wherein the offset values are associated with a plurality of different integer and sub-integer pixel locations, applying the offset values to predictive video blocks to generate offset predictive video blocks, and encoding video blocks of the coded unit based on the offset predictive video blocks.

In another example, this disclosure provides a method of decoding video data. The method comprises receiving a plurality of offset values for a coded unit of the video data, wherein the offset values are associated with a plurality of different integer and sub-integer pixel locations, applying the offset values to predictive video blocks to generate offset predictive video blocks, and decoding video blocks of the coded unit based on the offset predictive video blocks.

In another example, this disclosure provides an apparatus that encodes video data. The apparatus comprises a video encoder that calculates a plurality of offset values for a coded unit of the video data, wherein the offset values are associated with a plurality of different integer and sub-integer pixel locations, applies the offset values to predictive video blocks to generate offset predictive video blocks, and encodes video blocks of the coded unit based on the offset predictive video blocks.

In another example, this disclosure provides an apparatus that decodes video data. The apparatus comprises a video decoder that receives a plurality of offset values for a coded unit of the video data, wherein the offset values are associated with a plurality of different integer and sub-integer pixel locations, applies the offset values to predictive video blocks to generate offset predictive video blocks, and decodes video blocks of the coded unit based on the offset predictive video blocks.

In another example, this disclosure provides a device that encodes video data, the device comprising means for calculating a plurality of offset values for a coded unit of the video data, wherein the offset values are associated with a plurality of different integer and sub-integer pixel locations, means for applying the offset values to predictive video blocks to generate offset predictive video blocks, and means for encoding video blocks of the coded unit based on the offset predictive video blocks.

In another example, this disclosure provides a device that decodes video data, the device comprising means for receiving a plurality of offset values for a coded unit of the video data, wherein the offset values are associated with a plurality of different integer and sub-integer pixel locations, means for applying the offset values to predictive video blocks to generate offset predictive video blocks, and means for decoding video blocks of the coded unit based on the offset predictive video blocks.

In another example, this disclosure provides a device comprising a video encoder and a wireless transmitter. The video encoder calculates a plurality of offset values for a coded unit of the video data, wherein the offset values are associated with a plurality of different integer and sub-integer pixel locations, applies the offset values to predictive video blocks to generate offset predictive video blocks, and encodes video blocks of the coded unit based on the offset predictive video blocks. The wireless transmitter sends the encoded data to another device.

In another example, this disclosure provides a device comprising a wireless receiver and a video decoder. The wireless receiver receives encoded video data from another device. The video decoder receives a plurality of offset values for a coded unit of the video data, wherein the offset values are associated with a plurality of different integer and sub-integer pixel locations, applies the offset values to predictive video blocks to generate offset predictive video blocks, and decodes video blocks of the coded unit based on the offset predictive video blocks.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution cause a device to encode video data. In particular, the instructions cause the device to calculate a plurality of offset values for a coded unit of the video data, wherein the offset values are associated with a plurality of different integer and sub-integer pixel locations, apply the offset values to predictive video blocks to generate offset predictive video blocks, and encode video blocks of the coded unit based on the offset predictive video blocks.

In addition, this disclosure also contemplates a computer-readable medium comprising instructions that upon execution cause a device to decode video data. In this case, upon receiving a plurality of offset values for a coded unit of the video data, wherein the offset values are associated with a plurality of different integer and sub-integer pixel locations, the instructions cause the device to apply the offset values to predictive video blocks to generate offset predictive video blocks, and decode video blocks of the coded unit based on the offset predictive video blocks.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes techniques performed by an encoder and a decoder in order to add offset to predictive video blocks during the motion compensation process of video coding. According to one aspect of this disclosure, the encoder may generate a plurality of offset values for each coded unit, and apply the offset values to predictive data that is used to code the video blocks of the coded unit. In particular, the encoder may define different offset values for integer pixel locations and different sub-integer pixel locations. The appropriate offset value may be applied to corresponding predictive data based on pixel location associated with that predictive data. The sub-integer pixel locations may correspond to interpolated or extrapolated data, which is interpolated or extrapolated based on the data at integer pixel locations. By accounting for different offsets at different pixel locations (integer and sub-integer pixel locations), the resultant offset predictive data may provide for better compression than the original predictive data. In this way, the techniques of this disclosure may improve video quality. For example, the addition of offset to predictive data may improve coding during illumination changes between frames of a video sequence, e.g., such as during flashes, a darkening sky, or other types of illumination changes between frames.

The ITU-T H.264 standard supports fractional interpolation of sub-integer pixels to quarter-pixel resolution. In this case, fifteen possible sub-integer pixel locations exist for every integer pixel location. Therefore, in this case, according to this disclosure, sixteen different offset values may be generated for each possible integer and sub-integer pixel location of the coded unit. The corresponding offset value may be applied to any predictive data based on pixel location associated with that predictive data. In particular, an offset value may be applied to adjust pixel values of a predictive video block, and the offset value that is used to make such pixel value adjustments may be dependent upon the location associated with that predictive video block (e.g., integer location or one of several possible sub-pixel locations).

The different offset values may be encoded as part of the bitstream for each coded unit. The decoder may receive the different offset values that were defined by the encoder for each coded unit. Accordingly, the decoder can generate predictive data and then reconstruct the offset predictive data based on the predictive data and the offset values. The decoder can decode the video data of the coded unit, e.g., the video blocks, based on the offset predictive data generated based on the predictive data and the offset values. As with the encoding, the addition of offset to the prediction data may improve video decoding by improving video quality during illumination changes or other video effects.

Figure 1:
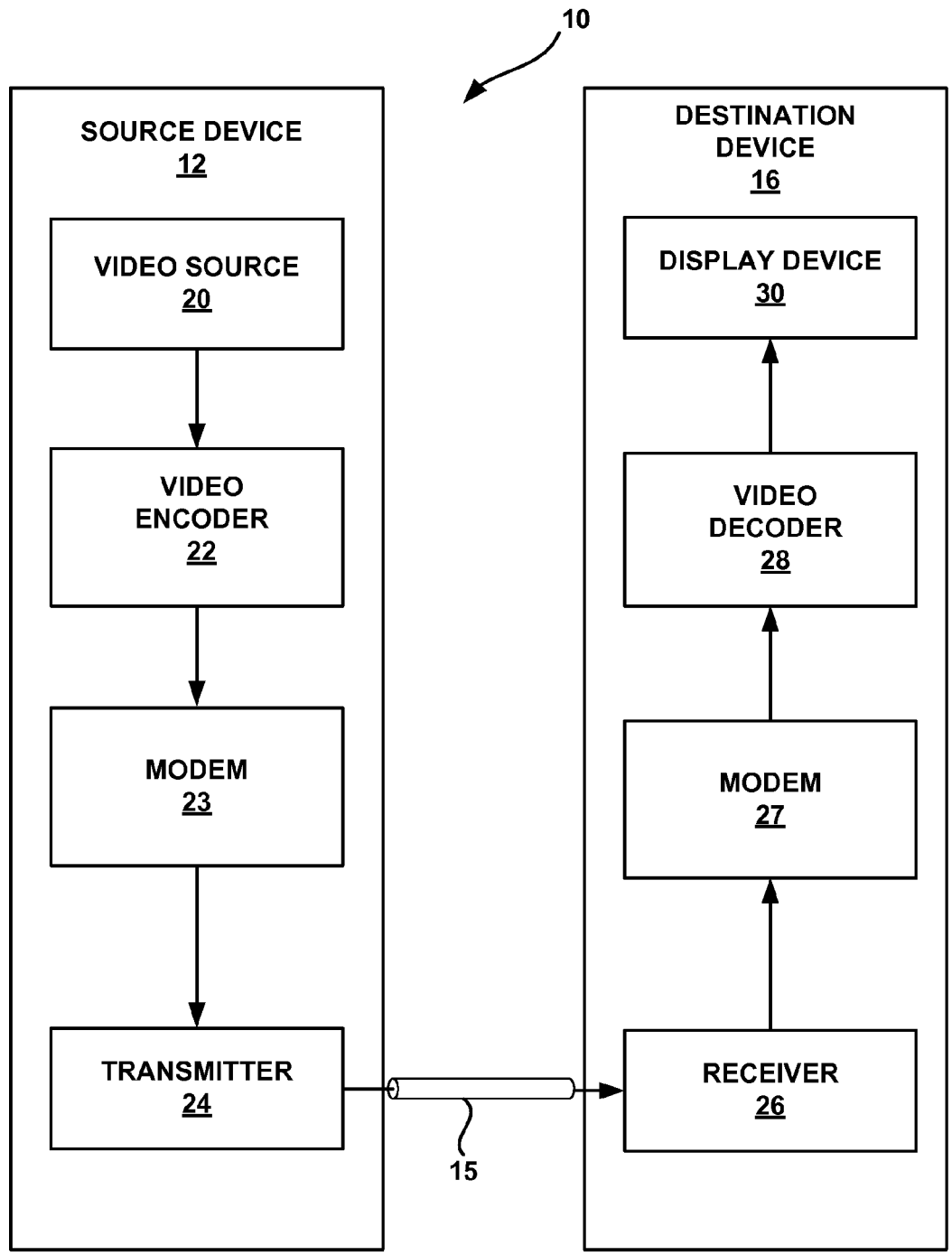
FIG. 1 is an exemplary block diagram illustrating a video encoding and decoding system.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any wireless devices that can communicate video information over a communication channel 15, in which case communication channel 15 is wireless. The techniques of this disclosure, however, which concern the addition of offset to predictive data during motion compensation, are not necessarily limited to wireless applications or settings.

In the example of FIG. 1, source device 12 may include a video source 20, video encoder 22 a modulator/demodulator (modem) 23 and a transmitter 24. Destination device 16 may include a receiver 26 a modem 27, a video decoder 28, and a display device 30. In accordance with this disclosure, video encoder 22 of source device 12 may be configured to apply one or more of the offset techniques of this disclosure as part of a video encoding process. Similarly, video decoder 28 of destination device 16 may be configured to apply one or more of the offset techniques of this disclosure as part of a video decoding process.

The illustrated system 10 of FIG. 1 is merely exemplary. The offset techniques of this disclosure may be performed by any encoding device that supports motion compensated interpolation to sub-pixel resolution. Source device 12 and destination device 16 are merely examples of such coding devices in which source device 12 generates coded video data for transmission to destination device 16. Devices 12, 16 may operate in a substantially symmetrical manner such that, each of devices 12, 16 include video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to add offset to predictive data during motion compensation. The video decoding process performed by video decoder 28 may also perform such techniques during its motion compensation stage of the decoding process. The information communicated over channel 15 may include offset information defined by video encoder 22, which is also used by video decoder 28. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular coding standard. Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG)

together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work extensions to H.264/MPEG-4 AVC.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame includes a series of slices. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform or a conceptually similar transformation process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, or another independently decodable unit defined according to the coding techniques used.

Following inter-based predictive coding (which includes interpolation and the techniques of this disclosure to define offset values for different integer and sub-integer pixel locations), and following any transforms (such as the 4×4 or 8×8 integer transform used in H.264/AVC or a discrete cosine transform DCT), quantization may be performed. Quantization generally refers to a process in which coefficients are quantized to possibly reduce the amount of data used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

According to the techniques of this disclosure, video encoder 22 may calculate a plurality of offset values for a coded unit of the video data, such as a frame or an independently decodable portion of a frame such as a slice. The different offset values are associated with a plurality of different integer and sub-integer pixel locations associated with video blocks. The sub-integer pixel locations may define locations of interpolated or extrapolated data, which typically is interpolated or extrapolated based on the data at the integer pixel locations. Video encoder 22 may apply the offset values to predictive video blocks to generate offset predictive video blocks, and encode video blocks of the coded unit based on the offset predictive video blocks. Video encoder 22 may also encode the offset values as part of a coded bitstream that includes the coded video blocks of the coded unit, and transmitter 24 of source device 12 may transmit the coded bitstream to receiver 26 of destination device 16. In particular, video encoder may apply offset values by adjusting pixels of predictive video blocks, and may encode video blocks based on the offset predictive video blocks by generating residuals based on the offset predictive video blocks. For example, residuals may be generated by subtracting a block to be coded from the appropriate offset predictive video block. Since offset is added to the pixel values of the offset predictive video block based on location of the predictive video block, coding efficiency may be improved, particularly during flashes or background lighting changes.

In destination device 16, video decoder 28 receives the plurality of offset values for each coded unit of the video data. Video decoder 28 applies the offset values to predictive video blocks to generate offset predictive video blocks, and decodes video blocks of the coded unit based on the offset predictive video blocks. In this way, the offset values are defined and applied at video encoder 22 as part of the encoding process, and communicated from source device 12 to destination device 16 as part of an encoded bitstream. The offset values are then applied to predictive data at video decoder 28 as part of the decoding process in order to reconstruct the video sequence. In this case, offset to predictive data is created and used during video reconstruction.

Figure 2:
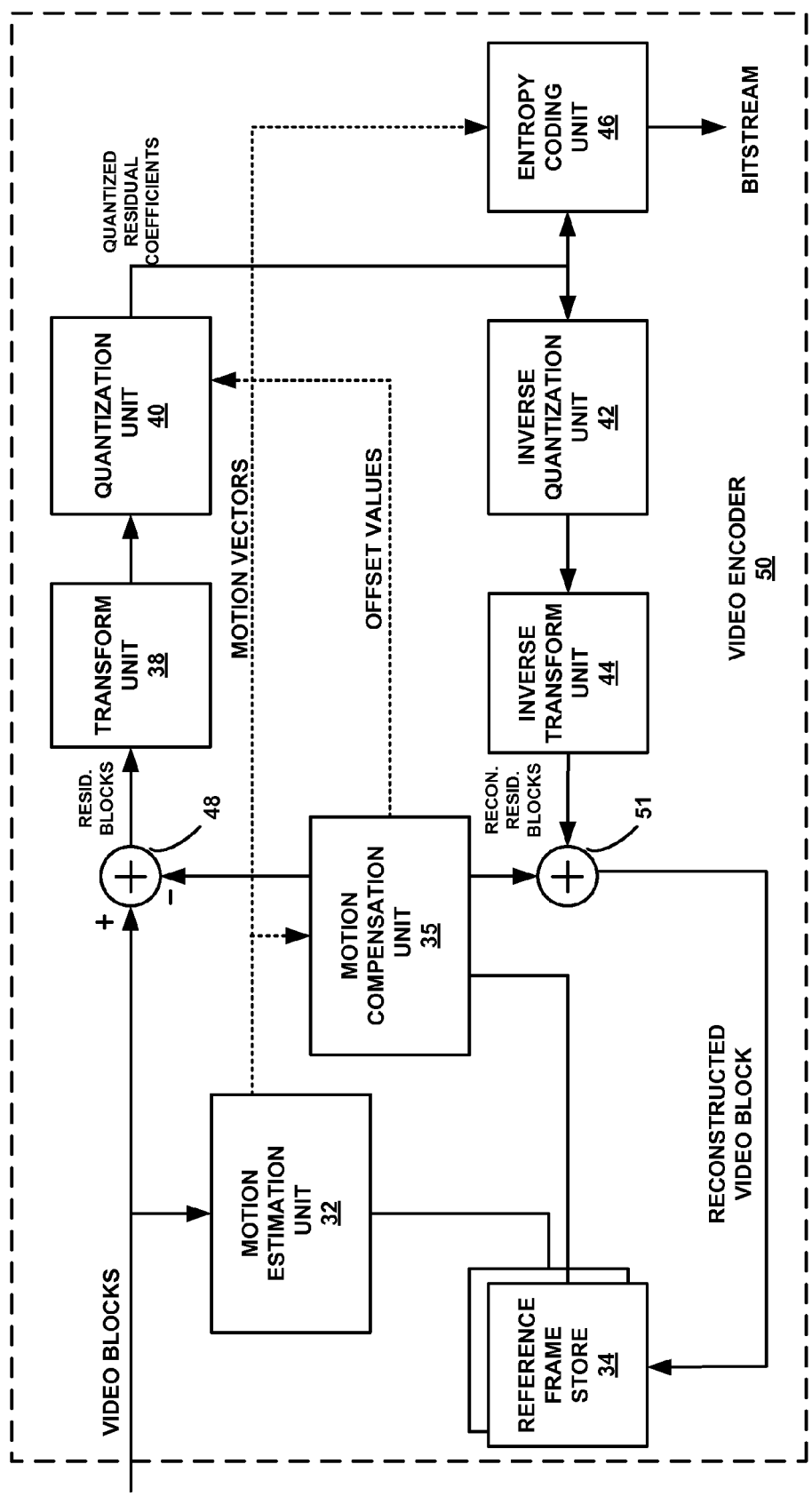
FIG. 2 is a block diagram illustrating an example of a video encoder consistent with this disclosure.

FIG. 2 is a block diagram illustrating an example of a video encoder 50 that may perform offset techniques consistent with this disclosure. Video encoder 50 may correspond to video encoder 22 of device 20, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-dirrectional (B-mode) may refer to the temporal based compression modes. The techniques of this disclosure apply during inter-coding, and therefore, intra-coding units such as spatial prediction unit are not illustrated in FIG. 2 for simplicity and ease of illustration.

As shown in FIG. 2, video encoder 50 receives a current video block within a video frame to be encoded. In the example of FIG. 2, video encoder 50 includes motion estimation unit 32, a motion compensation unit 35, a reference frame store 34, an adder 48, a transform unit 38, a quantization unit 40, and an entropy coding unit 46. For video block reconstruction, video encoder 50 also includes an inverse quantization unit 42, an inverse transform unit 44 adder 51. A deblocking filter (not shown) may also be included to filter block boundaries to remove blockiness artifacts from reconstructed video. If desired, the deblocking filter would typically filter the output of adder 51.

During the encoding process, video encoder 50 receives a video block to be coded, and motion estimation unit 32 and motion compensation unit 35 perform inter-predictive coding. Motion estimation unit 32 and motion compensation unit 35 may be highly integrated, but are illustrated separately for conceptual purposes. Motion estimation is typically considered the process of generating motion vectors, which estimate motion for video blocks. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, motion estimation unit 32 and motion compensation unit 35 may be functionally integrated. For demonstrative purposes, the offset techniques described in this disclosure are described as being performed by motion compensation unit 35.

Motion estimation unit 32 selects the appropriate motion vector for the video block to be coded by comparing the video block to video blocks of a predictive coded unit (e.g., a previous frame). At this point, motion compensation unit 35 may perform interpolation in order to generate predictive data at sub-pixel resolution. In particular, once motion estimation unit 32 has selected the motion vector for the video block to be coded, motion compensation unit 35 generates the predictive video block associated with that motion vector. Motion compensation unit 35 may generate one or more versions of any predictive video block that has sub-pixel resolution, e.g., possibly applying several different interpolation filters to generate different sets of interpolated data. For example, motion compensation unit 35 may apply a plurality of pre-defined interpolation filters in order to generate a plurality of different interpolated prediction data for the video block to be coded. Motion compensation unit 35 then selects the interpolated prediction data (e.g., an interpolated video block associated with one of the interpolation filters) that achieves the highest level of compression. In some cases, the interpolation filter that was used to generate the prediction data may be indicated by data coded as one or more interpolation syntax elements, and communicated to entropy coding unit 46 for inclusion in the coded bitstream.

According to this disclosure, motion compensation unit 35 may perform a second coding pass with respect to a coded unit in order to add offset to the predictive data, and thereby improve the level of compression that may be achieved. In particular, pixel values of predictive video blocks may be offset upward or downward according to the offset associated with integer or non-integer pixel locations of the predictive video blocks. The interpolations performed by motion compensation unit 35 may define interpolated data at several possible sub-integer pixel locations for different video block. Rather than define a single offset value for a given coded unit, motion compensation unit may define different offset values for each possible integer and sub-integer pixel location. Prediction data can then apply location-specific offset based on the pixel location associated with the prediction data.

In one example, motion compensation unit 35 may calculate a first set of metrics (e.g., mean values) respectfully associated with video blocks of the coded unit that are encoded based on the predictive video blocks at each integer and sub-integer pixel location. Motion compensation unit 35 may also calculate a second set of metrics (e.g., mean values) respectfully associated with each integer and sub-integer pixel location for the predictive video blocks, e.g., those predictive blocks that are actually used to encode video blocks of the coded unit. That is, the first set of metrics is defined by the data being coded, and the second set of metrics is defined by the predictive data used for predictive coding. Motion compensation unit 35 then calculates the plurality of offset values based on the first and second sets of metrics. The offset values may comprise absolute values or signed values that are used to bias all of the pixel values of a corresponding video block upward or downward, which again may be very useful for scene changes or flashes encountered in video encoding.

The first set of metrics may comprise a first set of mean values associated with respective video blocks of the coded unit that are coded based on the predictive video blocks at each integer and sub-integer pixel location, and the second set of metrics may comprise a second set of mean values respectfully associated with each integer and sub-integer pixel location for the predictive video blocks used to encode the respective video blocks of the coded unit. In this case, the plurality of offset values may comprise differences between the first set of mean values and the second set of mean values. In this way, several different offset values may be defined for several different integer and sub-integer pixel locations based on actual data coded in a first coding pass.

In other words, the first set of metrics may comprise a set of mean values that correspond to the mean of pixel values of respective video blocks of a given coded unit that are coded based on each respective integer and sub-integer pixel location. The second set of metrics may comprise a set of mean values that correspond to the mean of pixel values at each integer and sub-integer pixel location of predictive blocks actually used to predict the current blocks that are being coded in that coded unit. The pixel values of any predictive blocks that are considered but not actually used for prediction of coded video blocks are not included in defining the second set of metrics. The plurality of offset values may comprise differences between the first set of mean values and the second set of mean values. Each macroblock location may be defined by a single pixel, e.g., the respective pixel in the upper left-hand corner of the respective macroblock. However, each macroblock may define sixteen pixel values that contribute to a particular mean value in the first set of mean values. The techniques of this disclosure, of course, may also apply to other sized video blocks. Generally, the offset for any given position can be calculated as the difference between the mean of all pixels in the current frame (or other coded unit) that have motion vector precision corresponding to that pixel position or sub-pixel position, and the mean of the interpolated values of predictive data corresponding to that pixel position or sub-pixel position and used for prediction of the video blocks of the current frame. Thus, each respective offset may be viewed as the average difference of pixels of the coded unit relative to predictive data used in coding the coded unit for each respective integer, interpolated or extrapolated position that is defined in the coding scheme.

The offset technique of this disclosure may apply with respect to luma blocks, chroma blocks or both. Different offsets may be defined for each integer and sub-integer pixel location associated with each type of video block (e.g., luma and chroma blocks). Furthermore, different offsets could be assigned to each block at each particular size, partition or sub-partition of each block.

Once the offset values are defined, motion compensation unit 35 may perform a second coding pass in order to code the video data based on the predictive data and the offsets. In particular, motion compensation unit 35 may apply the offset values to original predictive video blocks to generate offset predictive video blocks, and encode video blocks of the coded unit based on the offset predictive video blocks. By adding offset to the pixel values of predictive blocks in a location-based manner according to pixel locations of the predictive blocks (integer location or one of a plurality of possible sub-integer pixel locations), the predictive blocks may be more similar to the blocks being coded, which can improve coding efficiency. Moreover, since offset values are defined differently for different pixel locations, the techniques of this disclosure may provide an ability to achieve segmentation among the coding of data associated with different types of interpolation.

Once motion compensation unit 35 has generated offset prediction data (e.g., an offset predictive video block that may be interpolated data or integer-based data), video encoder 50 forms a residual video block by subtracting the offset prediction data from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 16-bit value may be rounded down to a 15-bit value during quantization. In addition, quantization unit 40 may also quantize the different offsets using techniques of this disclosure to allocate a desired number of bits to respective integer and fractional portions of the different offsets. In particular, quantization unit 40 may, for each of the offset values, assign a first number of bits to an integer portion of a given offset value and assign a second number of bits to a fractional portion of the given offset value, wherein the first and second numbers of bits are determined based on a magnitude of the integer portion. Entropy coding unit 46 may encode the first number of bits differently than the second number of bits.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax including the offset values that identify the plurality of different offsets at different integer and sub-integer pixel locations within the coded unit.

Inverse quantization unit 42 and inverse transform unit 44 apply inverse quantization and inverse transformation, respectively, to reconstruct the residual block in the pixel domain, e.g., for later use a reference block. Summer 51 adds the reconstructed residual block to the motion compensated prediction block produced by motion compensation unit 35 to produce a reconstructed video block for storage in reference frame store 34. The reconstructed video block may be used by motion estimation unit 32 and motion compensation unit 35 as a reference block to inter-encode a block in a subsequent video frame.

Figure 3:
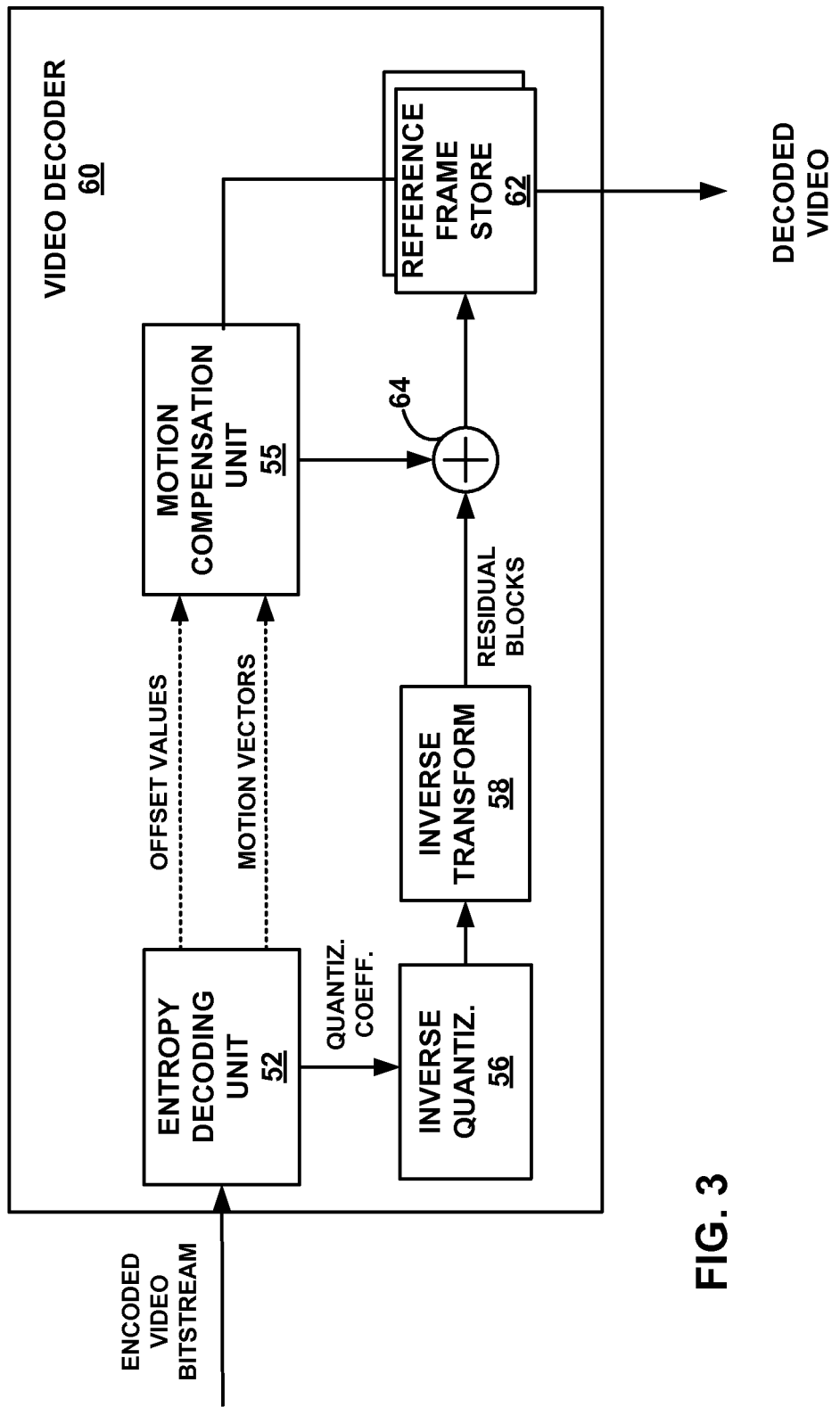
FIG. 3 is a block diagram illustrating an example of a video decoder consistent with this disclosure.

FIG. 3 is a block diagram illustrating an example of a video decoder 60, which decodes a video sequence that is encoded in the manner described herein. Video decoder 60 includes a motion compensation unit 55 that performs the offset techniques of this disclosure during the decoding. In particular, on the decoding side, motion compensation unit 55 may receive a syntax element from entropy decoding unit 52 that identifies a plurality of offset values for the coded unit, e.g., defining different offsets for integer pixel locations and one or more non-integer pixel locations. Motion compensation unit 55 may generate prediction data based on motion vectors received from entropy decoding unit 52 and may add the appropriate offset to such prediction data (based on pixel location of the prediction data) to generate offset prediction data. The prediction data may be interpolated data, in which case, a corresponding one of the offset values for a non-integer location may be applied to the prediction data to generate the offset prediction data. Based on this offset prediction data, the video data (e.g., a reconstructed residual video block) can be decoded. In particular the decoder may combine the offset prediction data with the residual video block to generate the originally video block that was encoded.

Entropy decoding unit 52 entropy decodes the received bitstream to generate quantized coefficients and the syntax (e.g., motion vectors and a plurality of offset values for the coded unit). The syntax is forwarded from entropy coding unit 52 to motion compensation unit 55. Inverse quantization unit 56 inverse quantizes, i.e., de-quantizes, the quantized block coefficients. The inverse quantization process may be a conventional process as defined by H.264 decoding. Inverse transform unit 58 applies an inverse transform, e.g., an inverse DCT or conceptually similar inverse transform process, to the transform coefficients in order to produce residual blocks in the pixel domain. Motion compensation unit 55 produces motion compensated blocks, possibly performing interpolation based on one or more sets of interpolation filter coefficients, which may also be included in the syntax. Once motion compensation unit 55 generates the predictive blocks based on the motion vectors, the appropriate offset for each predictive block can be added to the predictive blocks generate the offset predictive blocks that were used in the original encoding performed by the encoder.

Summer 64 decodes residual blocks by summing the residual blocks with the corresponding offset prediction blocks generated by motion compensation unit 55 to form decoded blocks. If desired, a deblocking filter may also be applied to filter the decoded blocks in order to remove blockiness artifacts. The decoded video blocks are then stored in reference frame store 62, which provides reference blocks for subsequent motion compensation and also produces decoded video to a drive display device (such as device 28 of FIG. 1).

Again, the techniques of this disclosure concern the application of offset to motion compensated predictive data, in which the different offsets are used for integer and different sub-integer pixel locations defined by interpolation. The encoder uses the techniques of this disclosure to define and apply the different offset values, and the decoder interprets syntax elements sent from the encoder in order to identify that same offset values defined and used by the encoder. The appropriate offset is applied to pixel values of predictive data, and the appropriate offset is selected based on the pixel location defined for such predictive data, e.g., an integer pixel location or one of several possible non-integer pixel locations.

Figure 4:
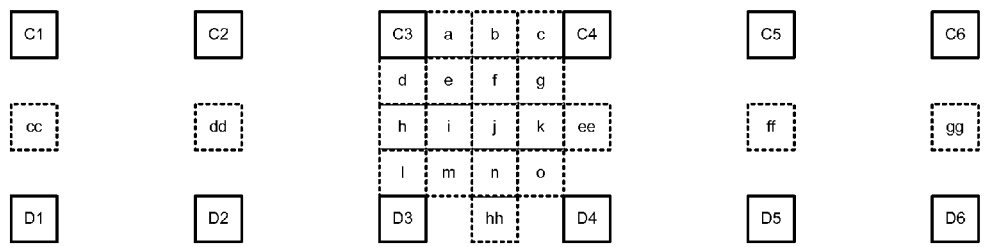
FIG. 4 is a conceptual diagram illustrating integer pixels and various sub-integer pixels that may comprise pixels of predictive video blocks.

FIG. 4 is a conceptual diagram illustrating integer pixel locations associated with predictive data, and sub-integer pixel locations associated with interpolated predictive data. In the conceptual illustration of FIG. 4, the different boxes represent pixels. Capitalized letters (in the boxes with solid lines) represent integer pixel locations, while small letters (in the boxes with dotted lines) represent the sub-integer interpolated pixel locations. Pixel locations "aa," "bb," "cc," "dd," "ee," "ff," "gg," "hh," "ii," and "jj," are half-pixel locations used in the fractional interpolations various fractional locations associated with pixel location "C3." Each pixel may correspond to an upper right-hand pixel of a video block such that that pixel defines the video block. For interpolation or extrapolation, each of the pixels of a video block are interpolated or extrapolated the same way with respect to different integer pixels that have the same spatial distance from the respective sub-integer pixels.

Every integer pixel location has an associated 15 different fractional ("sub-integer") locations. In the example of FIG. 4, these 15 different fractional locations associated with pixel "C3" are illustrated as sub-integer pixel locations "a," "b," "c," "d," "e," "f," "g," "h," "i," "j," "k," "l," "m," "n," and "o." Similarly, 15 different fractional locations associated with pixel "E5" are illustrated as sub-integer pixel locations "a'," "b'," "c'," "d'," "e'," "f'," "g'," "h'," "i'," "j'," "k'," "l'," "m'," "n'," and "o'." Most of the other fractional locations are not shown for simplicity (other than those mentioned above, which are used to generate one or more of the 15 different fractional locations associated with pixel "C3").

In the ITU H.264/AVC standard, for example, in order to obtain luma signals at half-pixel positions, a 6-tap Wiener filter with coefficients [1, −5, 20, 20, −5, 1] is typically used. Then, in order to obtain luma signals at quarter-pixel locations, a bilinear filter is used. The bilinear filter may also be used in fractional pixel interpolation for the chroma components, which may have up to ⅛-pixel precision in H.264/AVC.

After motion estimation, the best motion vector for a given video block may be identified, e.g., possibly using a rate-distortion model in order to balance the coding rate and video quality. The prediction video block is formed during motion compensation using the best motion vector. As outlined above, the residual video block is formed by subtracting the prediction video block from the original video block. A transform is then applied on the residual block, and the transform coefficients are quantized and entropy coded to further reduce bit rate.

Rather than use the predictive video blocks to generate the residuals, however, the techniques of this disclosure add offset to the predictive video blocks. Moreover, the offset may be location-specific in that different offsets are defined for different integer and sub-integer pixel locations. The offset associated with video blocks identified by pixels "b" and "b'" may be the same since these two pixels define the same sub-integer pixel location with respect to integer pixels C3 and E5. However, the offset associated with video blocks identified by pixels "c" and "d'" may be different since pixels "c" and "d'" define different sub-integer pixel locations with respect to integer pixels C3 and E5. Each of the sixteen different pixel locations "C3," "a," "b," "c," "d," "e," "f," "g," "h," "i," "j," "k," "l," "m," "n," and "o" may define different offsets. Moreover, these different offsets may also apply respectfully to each of the sixteen different pixel locations "E5," "a'," "b'," "c'," "d'," "e'," "f'," "g'," "h'," "i'," "j'," "k'," "l'," "m'," "n'," and "o'." The offsets may define a signed value that essentially biases every pixel value of the predictive block upward or downward to generate an offset predictive block. The offsets may be referred to as DC offsets since they comprise an average difference of all pixels of the coded unit predicted based on a particular sample location (integer or particular sub-integer location) relative to the mean of all corresponding predictive pixels used for predictive coding at each respective sample location.

Again, FIG. 4 shows the integer-pixel samples (also called full-pixels) in the solid boxes with upper-case letters. For any given integer-pixel sample, there may be 15 sub-pixel positions, which are shown for integer-pixel sample "C3" and labeled "a" through "o" in FIG. 4. In accordance with H.264/AVC motion compensation unit 35 may calculate the half-pixel positions "b," "h," and "j" first using a one-dimensional 6-tap Wiener filter. The interpolation filter may be applied first in the horizontal direction and then in the vertical direction, or vice versa. Motion compensation unit 35 may then filter the remaining quarter-pixel positions using the bilinear filter and the already calculated half-pixel samples.

The actual filters applied to generate interpolated data may be subject to a wide variety of implementations. As one example, motion compensation unit 35 may use adaptive interpolation filtering to define the interpolated values. In another example, several sets of interpolation filters may be applied and the set that yields the best predictive data may be selected. The addition of offset, per this disclosure, occurs after generating any interpolated predictive data used in the coding.

The ITU-T SG16/Q.6/VCEG (Video Coding Expert Group) committee has been exploring coding technologies that offer higher coding efficiency than H.264/AVC. Such exploration includes work done in the KTA (Key Technology Areas) forum. One of the coding tools that have been adopted into KTA is called adaptive interpolation filter (AIF). AIF offers large coding gain over H.264/AVC, especially on video sequences with high resolution (e.g., 720p). In AIF, the interpolation filter for each sub-pixel position is analytically calculated for each video frame by minimizing the prediction error energy. The analytically derived adaptive filter coefficients for each frame are then predicted, quantized, coded, and sent in the video bitstream. The offset techniques of this disclosure could work within an AIF scheme, as well as many other interpolation schemes.

Three different types of AIF schemes have been adopted into KTA. The first is a two-dimensional non-separable AIF (NS-AIF), the second is a separable AIF (S-AIF), and the third is an AIF with directional filters (DAIF). However, all three AIF schemes use the same analytical process to derive the filter coefficients, which is explained below using non-separable AIF as an example.

Assume a 6×6 two-dimensional non-separable filter has coefficients $h_{i,j}^{SP}$ where i,j=0 . . . 5 and SP represents one of the 15 sub-pixel positions (a through o) shown in FIG. 4. Note that 6 of the 15 sub-pixel positions "a,", "b," "c," "d," "h" and "i" are one-dimensional sub-pixel positions, and motion compensation unit 35 may use a 6-tap filter to interpolate such data. Also, assume that the prediction pixels at the integer-pixel positions (A1 through F6 in FIG. 4) in the reference frame take the pixel values of $P_{i,j}$ where i,j=0 . . . 5. That is, A1 takes the value of $P_{0,0}$, . . . , A6 takes the value of $P_{5,0}$, . . . , F1 takes the value of $P_{5,0}$, . . . , and F6 takes the value of $P_{5,5}$. Then, the interpolated value $p^{SP}$ at sub-pixel position SP, SP∈{a, . . . , o}, may be calculated by motion compensation unit 35 using the following equation.

$$p^{SP} = \sum_{i=0}^{5}\sum_{j=0}^{5} P_{i,j} h_{i,j}^{SP}$$

Let $S_{x,y}$ be the pixel value in the current video frame at position (x,y).

$$\tilde{x}=x+\lfloor mvx \rfloor - FO, \; \tilde{y}=y+\lfloor mvy \rfloor - FO,$$

where (mvx, mvy) is the motion vector, ($\lfloor mvx \rfloor$, $\lfloor mvy \rfloor$) is the integer component of the motion vector, and FO is the filter offset. For example, in the case of 6-tap filter, FO=6/2−1=2. For each sub-pixel position SP, the prediction error energy $(e^{SP})^2$ between the actual pixel value in the current frame and the interpolated value can be accumulated by motion compensation unit 35 for all pixels that have motion vector precision corresponding to sub-pixel position SP. The prediction error energy $(e^{SP})^2$ may be calculated motion compensation unit 35 using the following equation:

$$(e^{SP})^2 = \sum_x \sum_y (S_{x,y} - p_{x,y}^{SP}) \qquad (2)$$

$$= \sum_x \sum_y \left( S_{x,y} - \sum_{i=0}^{5}\sum_{j=0}^{5} h_{i,j}^{SP} P_{\tilde{x}+i,\tilde{y}+j} \right)^2$$

For each of the sub-pixel positions "a" ... "o", motion compensation unit 35 may set up an individual set of equations by computing the derivative of (eSP) with respect to the filter coefficients hsp. The number of equations, in this case, is equal to the number of filter coefficients used for the current sub-pixel position SP. For each two-dimensional sub-pixel position "e," "f," "g," "i," "j," "k," "l," "m," "n," and "o" using a 6×6-tap two-dimensional filter, a system of 36 equations with 36 unknowns can be solved by motion compensation unit 35. For the remaining sub-pixel positions "a," "b," "c," "d," "h," and "l," which may only require a one-dimensional filter, systems of 6 equations can be solved by motion compensation unit 35.

$$0 = \frac{(\partial e^{SP})^2}{\partial h_{k,l}^{SP}} \qquad (3)$$

$$= \frac{\partial}{\partial h_{k,l}^{SP}} \left( \sum_x \sum_y \left( S_{x,y} - \sum_i \sum_j h_{i,j}^{SP} P_{\tilde{x}+i,\tilde{y}+j} \right)^2 \right)$$

$$= \sum_x \sum_y \left( S_{x,y} - \sum_i \sum_j h_{i,j}^{SP} P_{\tilde{x}+i,\tilde{y}+j} \right) P_{\tilde{x}+k,\tilde{y}+l}$$

$$\forall k, l \in \{0; 5\}$$

In summary, one example process of deriving and applying the AIF filters may have the following steps, which can be performed by motion compensation unit 35:
1. Motion vectors (mvx, mvy) may be estimated for every video frame to be coded. During motion estimation, a fixed interpolation filter (e.g., the interpolation process of H.264/AVC) can be applied.
2. Using these motion vectors, prediction error energy for each sub-pixel position SP can be accumulated over the current video frame. Then, adaptive filter coefficients $h_{i,j}^{sp}$ can be calculated for each sub-pixel position SP independently by minimizing the prediction error energy as in the two prediction energy equations above.
3. New motion vectors can then be estimated. During this motion estimation process, the adaptive interpolation filters computed in step 2 may be applied. Using the adaptive interpolation filters, motion estimation errors, caused by aliasing, camera noise, etc., are reduced and better motion prediction is achieved.

All three existing AIF schemes use the same analytical process as given above. The differences between these schemes mostly lie in the number of unique filter coefficients used, whether the interpolation filters are separable or not, and what filter support (i.e., integer pixel positions used to interpolate) is used. In each of these schemes, certain symmetry constraints on the AIF filters are imposed to reduce the number of filter coefficients that need to be sent in the video bitstream.

In accordance with H.264/AVC, motion compensation unit 35 performs interpolations with intermediate rounding operations. In this case, half-pixel positions (b, h and j) are filtered and rounded before they are used to obtain the quarter-pixel positions. Moreover, during bilinear filtering, which is used to obtain the quarter-pixel values, upward rounding may be used by motion compensation unit 35 (i.e., (a+b+1)>>1 may be used in conventional bilinear filters). Such frequent and biased rounding operations by motion compensation unit 35 during interpolation may reduce precision of the interpolation filters. In particular, simulations have shown that higher-precision interpolation filters derived directly from the 6-tap Wiener filter and the bilinear filter used in H.264/AVC, provide significant gains over H.264/AVC, especially for the high definition video sequences, such as the 720p sequences. A significant portion of the gains achieved by the AIF schemes (NS-AIF, S-AIF, and DAIF) may come from the fact that these AIF schemes use higher precision filters than H.264/AVC.

In some cases, rather than use adaptive interpolation filtering, motion compensation unit 35 may use a relatively simple switched interpolation filter with offset (SIFO) scheme. In this case, instead of adaptively deriving the filter coefficients for each frame, which is a very costly process at the encoder side, motion compensation unit 35 may choose between a plurality fixed filters, e.g., which may be respectively defined by plurality of different pre-defined sets of interpolation filter coefficients. The choice of the interpolation filter may be done for each coded unit level (e.g., frame level or slice level) or for each sub-pixel position (sample level). Furthermore, according to this disclosure, DC offsets may also be added after prediction, and the DC offsets may also be defined for each possible integer or fractional pixel location as described herein.

Thus, motion compensation unit 35 may use different sets of fixed filters in order to define several possible alternatives of interpolation data. As examples, motion compensation unit 35 may use a standard ITU-T H.264 filter set, a filter set based on H.264/AVC but with higher precision (without intermediate rounding for ½-pixel positions and biased rounding for ¼-pixel positions) or a set of customized interpolation filters. The set of customized interpolation filters may be pre-defined by using a set of training video sequences. For example, adaptive filters that minimize prediction error energy may be derived by motion compensation unit 35 applying the analytical process used in AIF schemes to the training video set. Then, the average filters for each sub-pixel position may be calculated and used as the customized interpolation filters. The average filter for a particular sub-pixel position may then be normalized such that all filter coefficients add up to 1.0.

The average filter may then also be quantized to a certain fixed-point precision (e.g., 13-bit precision).

By having fixed-point precision in the filter coefficient, drift across different platforms can be eliminated or avoided. In this case, a true fixed-point implementation may be derived from the filter coefficients obtained in any manner described herein. The customized filters may have different characteristics. Specifically, customized filters may be non-separable filters or separable filters, and they may have different filter sizes (e.g., 6×6, 4×4, or other sizes).

The filter set that offers the best prediction (i.e., the smaller prediction error energy) can be chosen by motion compensation unit 35 and applied to generate the interpolated data. When multiple reference frames are used, different filter sets may be selected for different reference frames. In one example, motion compensation unit 35 may apply standard filters for the ½-pixel positions (positions b, h and l), and motion compensation unit 35 ma apply a customized filter set for the other ¼-pixel positions.

Regardless of the type of interpolations that are performed or the interpolation filters that are used, once the predictive data is generated or interpolated by motion compensation unit 35, DC offset can be applied to the predictive data based on the sample location associated with the interpolated (or non-interpolated) data. In particular, this disclosure provides the use of different DC offsets for different integer or sub-integer pixel locations. Again, in the example data shown in FIG. 4, this means that each of the sixteen different pixel locations "C3," "a," "b," "c," "d," "e," "f," "g," "h," "i," "j," "k," "l," "m," "n," and "o" may define it own, different offset. Hence, for sixteen possible integer and sub-integer locations, there may be sixteen different offsets. Moreover, these different offsets may also apply respectfully to each of the sixteen different pixel locations "E5," "a'," "b'," "c'," "d'," "e'," "f'," "g'," "h'," "i'," "j'," "k'," "l'," "m'," "n'," and "o',".

Adding DC offsets to the pixels of prediction data can help to capture effects of illumination changes between different video frames. Illumination changes may be caused by such things as flashes or a darkening sky in a video sequence. H.264/AVC uses weighted prediction, which may allow offsets to be added to the prediction pixel value. However, the DC offsets defined by H.264/AVC weighted prediction may only be allowed on a frame level, meaning that only one offset value is defined for a given frame regardless of whether prediction data of a video block is interpolated or not.

In accordance with this disclosure, DC offset may be defined differently for different sample positions associated with interpolated and non-interpolated data. Thus, different DC offsets may be defined for each of the 15 sub-pixel positions shown in FIG. 4 ("a," "b," "c," "d," "e," "f," "g," "h," "i," "j," "k," "l," "m," "n," and "o") and another DC offset may be defined for integer-pixel positions. When sample-based DC offsets are used, a total of 16 DC offsets may be coded and sent in the video bitstream. By applying sample-based DC offsets, motion compensation unit 35 may be provide a simple but effective motion segmentation tool. Take, for example, a video frame that contains a darkening sky as still background and a moving object as the foreground. In this case, the background and the foreground may have different degrees of illumination changes, and by using location-specific DC offset values defined by the location of the pixel that identifies a given video block, motion compensation unit 35 may be able to capture the different degrees of illumination changes in the foreground and the background in a more efficient manner than could be achieved without such location-specific DC offset values.

Furthermore, when video blocks of a coded unit use multiple different reference frames, e.g., for bi-directional prediction, different DC offsets may be calculated and sent for each integer and sub-integer location associated with the different reference frames. In some cases, some reference frames may comprise a single frame-based DC offset, while other reference frames may have several location-specific DC offsets. Some schemes may use location-specific DC offsets only with respect to the reference frame that is closest in temporal distance to the current frame being coded, and all the other reference frames may use a single frame-based DC offset.

In order to code the DC offsets, 1 bit per frame may be used to indicate whether a single frame-based DC offset is used or whether several location-specific DC offsets are used. If the DC offsets have only integer precision, the values of these offsets may be coded using signed exponential-Golomb code. If the DC offsets have fractional precision, the values of the integer offset may be coded using a signed exponential-Golomb code, and the values of non-integer offsets may be coded using residual differences relative to the integer offset defined by the signed exponential-Golomb code.

For example, coding of the offsets may be done by first coding an integer offset and then coding each fractional offset. In this case, the integer offset and the fractional offsets are coded differently. The integer offset may be coded using signed exponential-Golomb code. Depending on the magnitude of the integer offset, the fractional offsets may be quantized differently than the integer offset. For example, coarser levels of quantization may be applied on the fractional offsets when an integer offset has a large magnitude. After quantization, the fractional offsets may be coded using fixed length codes. As an example, the following pseudo-code may illustrate how a given fractional offset may be coded using different fixed length codes defined based on the integer offset value.

---

Let offsetI be the integer offset
Let offsetF be the fractional offset
Let offsetFbits be the number of bits used to quantize offsetF
Let abs(a) be the absolute value of a
    if(abs(offsetI) = 0)
        offsetFbits = 5
    else if(abs(offsetI) < 3)
        offsetFbits = 4
    else if(abs(offsetI) < 7)
        offsetFbits = 2
    else
        offsetFbits = 0

---

In this case, the video encoder may include a quantization unit (e.g., unit 40 of video encoder 50) that for each of the offset values assigns a first number of bits to an integer portion a given offset value and assigns a second number of bits to a fractional portion of the given offset value, wherein the first and second numbers of bits are determined based on a magnitude of the integer portion. In this case, the offset values may be forwarded from motion compensation unit 35 to quantization unit 40, and quantization unit 40 may apply quantization consistent with the pseudo-code above. In any case, video encoder 50 may encode the first number of bits differently than the second number of bits.

In general, several location-specific DC offsets may be calculated as follows:
1. Motion vectors are estimated for every video block of a video frame to be coded.
2. For each pixel and sub-pixel position, the DC offset for that position can be calculated as the difference between the mean of all pixels in the current frame that have motion vector precision corresponding to that pixel position or sub-pixel position, and the mean of the interpolated values used to code the pixels in the current frame for each respective pixel position or sub-pixel position.

If a single frame-based DC offset is used for some frames, calculation of the frame level DC offset may be similar. In this case, the frame-level DC offset may be defined as the difference between the mean of all the pixels in the current frame that are inter predicted and the mean of the interpolated values used to predict those pixels.

As noted above, the DC offset values may be coded as part of the bitstream for each coded unit. Therefore, on the decoder side, the decoder simply applies the appropriate DC offset values to the pixels of any generated predictive video blocks. The DC offset value used by the decoder may be defined in syntax for the specific integer or sub-integer pixel location associated with each predictive video block. For example, a syntax element such as a header file of a coded unit may include flags or values to specify each of the plurality of offset values for that coded unit. The terms "offset" and "DC offset" are used interchangeably in this disclosure. The offset is referred to as DC offset insofar as an overall offset is defined for each same respective pixel location, e.g., one offset for the integer location and several different offsets for each possible sub-pixel location.

Figure 5:
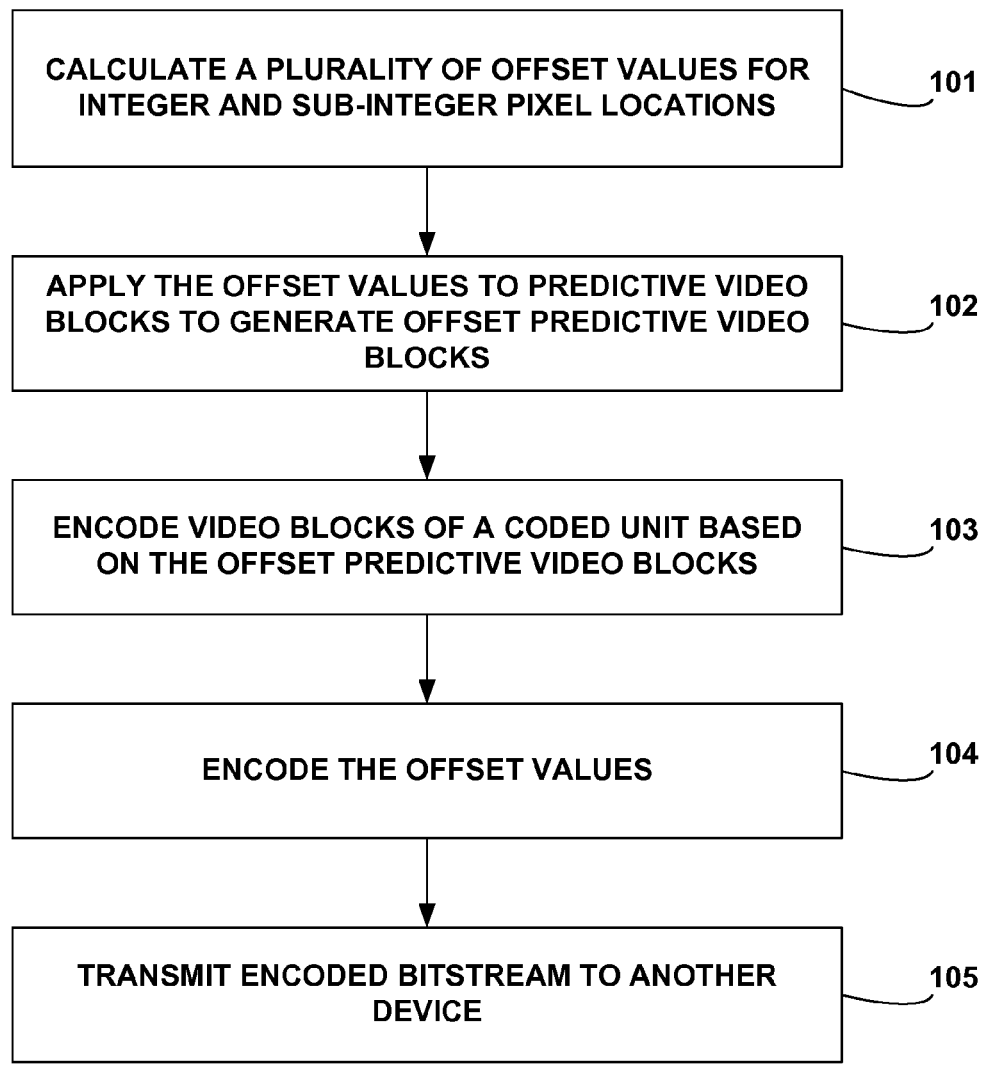
FIGS. 5-7 are flow diagrams illustrating techniques consistent with this disclosure.

FIG. 5 is a flow diagram illustrating an encoding technique that may be executed by an encoding device. The technique of FIG. 5 will be described from the perspective of video encoder 50 (FIG. 2) and source device 12 (FIG. 1). Video encoder 50 of FIG. 2 may correspond to video encoder 22 of FIG. 1.

As shown in FIG. 5, motion compensation unit 35 of video encoder 50 calculates a plurality of offset values for a coded unit the video data for integer and sub-integer pixel locations (101). Motion compensation unit 35 then applies the offset values to predictive video blocks to generate offset predictive video blocks (102), and video encoder 50 encodes video blocks of the coded unit based on the offset predictive video blocks (103), e.g., by invoking adder 48 to subtract the offset predictive video blocks from the video blocks being coded and thereby produce residual video blocks. Motion compensation unit 35 may forward the offset values to entropy coding unit 46, which encodes the offset values (104). In particular, entropy coding unit 46 may entropy encode the offset values as part of a coded bitstream that includes the coded video blocks of the coded unit. The encoded bitstream may then be transmitted to another device (105). In particular, the bitstream may be modulated by modem 23 (FIG. 1) and transmitted to destination device 16 via transmitter 24 (105).

As noted above, the coded unit may comprise a video frame, a slice of a video frame, or another independently decodable unit of video blocks. The offset values may include one offset value for integer pixel locations and several offset values for different sub-integer pixel locations. For example, consistent with the ITU-T H.264 standard which allows for 15 different sub-integer locations for interpolated data, the offset values may likewise include fifteen different offset values for fifteen different sub-integer pixel locations.

As described above, calculating the plurality of offset values may include calculating a first set of metrics associated with respective video blocks of the coded unit that are encoded based on the predictive video blocks at each integer and sub-integer pixel location, calculating a second set of metrics associated with each integer and sub-integer pixel location for the predictive video blocks actually used to encode the coded unit, and calculating the plurality of offset values based on the first and second sets of metrics. The first set of metrics may comprise a first set of mean values associated with pixels having motion vector precision to each integer and sub-integer pixel location for video blocks of the coded unit. The second set of metrics may comprise a second set of mean values associated with predictive pixels used in the encoding at each integer and sub-integer pixel location. The plurality of offset values may comprise differences between the first set of mean values and the second set of mean values. The method shown in FIG. 5 may be repeated for each coded unit of video data, in which case, motion compensation unit 35 may re-calculate the plurality of offset values for different coded units of the video data.

Figure 6:
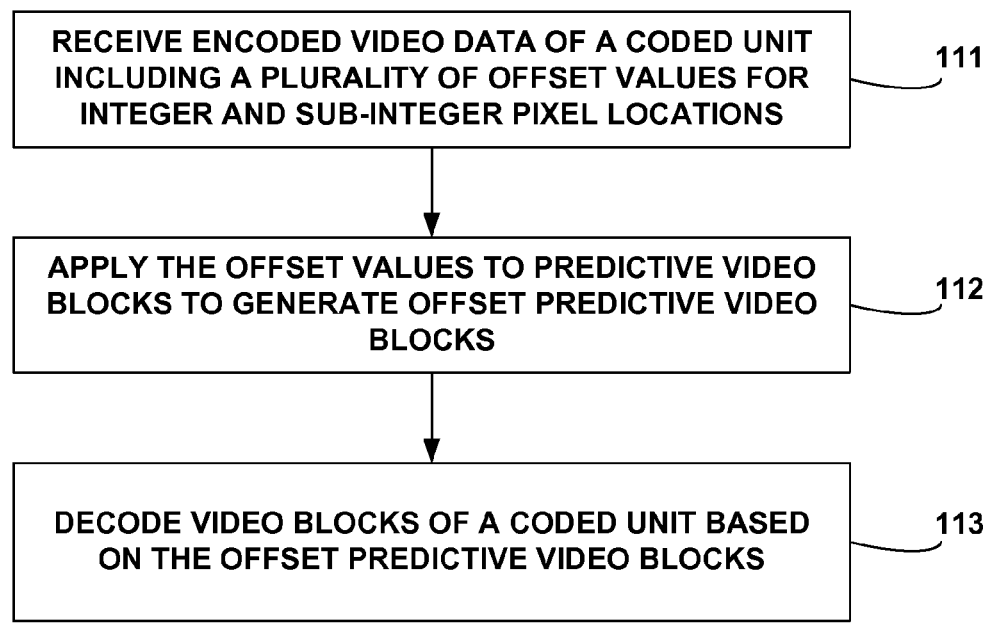

FIG. 6 is a flow diagram illustrating a decoding technique that may be executed by a decoding device. The technique of FIG. 6 will be described from the perspective of video decoder 60 (FIG. 3). Video decoder 60 of FIG. 3 may correspond to video decoder 28 of FIG. 1.

As shown in FIG. 6, motion compensation unit 55 receives encoded video data of a coded unit, including a plurality of offset values for different integer and sub-integer pixel locations (111). Entropy decoding unit 52 may receive an encoded bitstream and may entropy decode the bitstream in order to generate residual video blocks, motion vectors, and the plurality of offset values. Motion compensation unit 55 applies the offset values to predictive video blocks to generate offset predictive video blocks (112). In particular, motion compensation unit 55 may use the motion vectors to first generate the predictive video blocks, and may then apply the offset values to the predictive video blocks to generate offset predictive video blocks (112). Video decoder 60 can then decode the video blocks of the coded unit based on the offset predictive video blocks (113), e.g., by invoking adder 64 to add the residual blocks to the offset predictive video blocks used to code such residual blocks.

Again, the coded unit may a video frame, a slice of a video frame, or another independently decodable unit of video blocks. The offset values may include one offset value for integer pixel locations and several offset values for different sub-integer pixel locations, e.g., one offset value for an integer pixel location and fifteen different offset values for fifteen different sub-integer pixel locations. The offset values may comprise differences between a first set of mean values associated with respective video blocks of the coded unit that were encoded based on the predictive video blocks at respective integer and sub-integer pixel resolutions, and a second set of mean values associated with each integer and sub-integer pixel location for the predictive video blocks actually used in the encoding. The technique of FIG. 6 may be repeated for different coded units of the video data.

Figure 7:
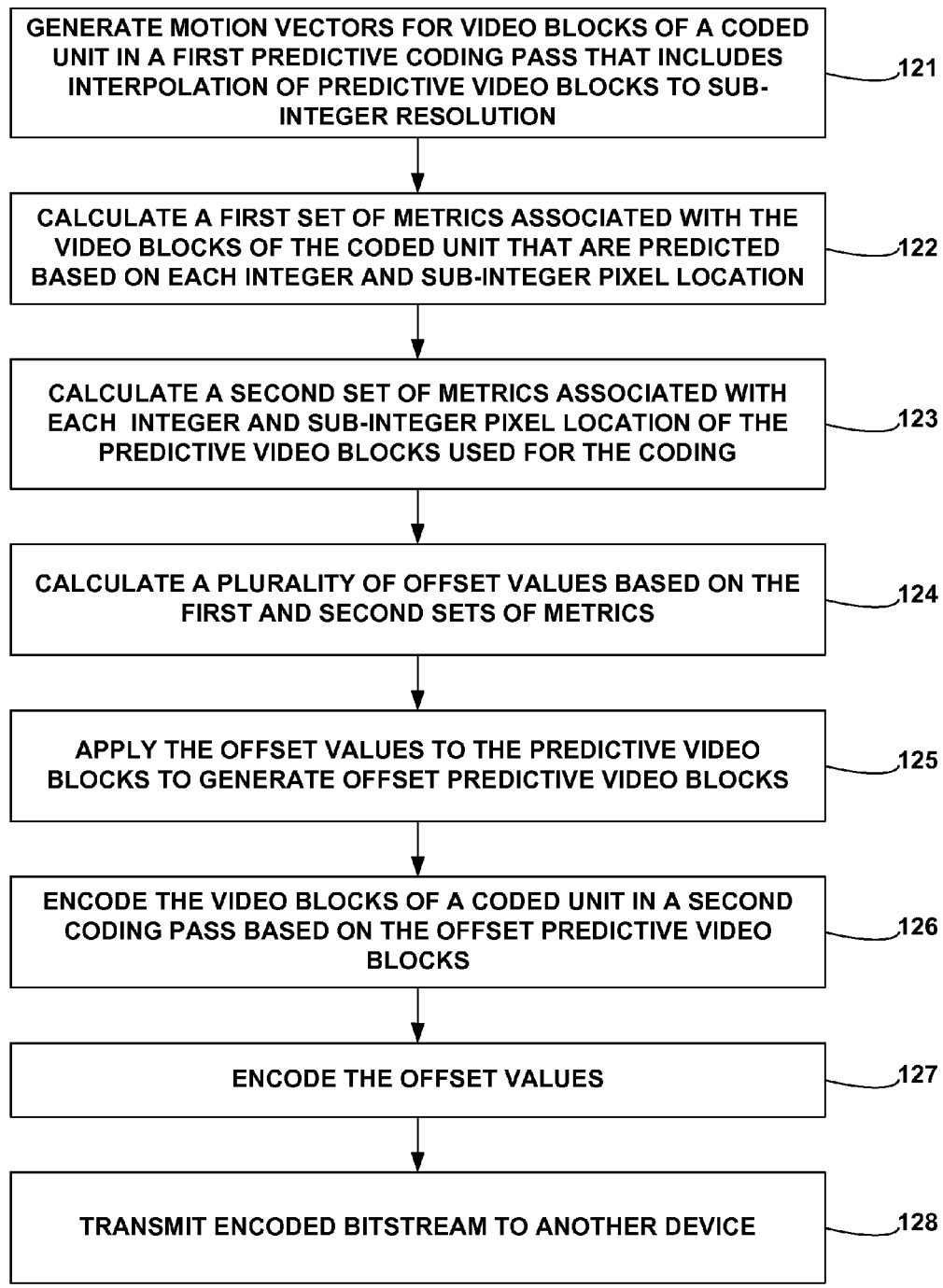

FIG. 7 is another flow diagram illustrating an encoding technique that may be executed by an encoding device. The technique of FIG. 7 will be described from the perspective of video encoder 50 and source device 12 (FIG. 1). Video encoder 50 of FIG. 2 may correspond to video encoder 22 of FIG. 1. As shown in FIG. 7, motion compensation unit 35 generates motion vectors for video blocks of a coded unit in a first predictive coding pass that includes interpolation of predictive blocks to sub-integer resolution (121). Motion compensation unit 35 calculates a first set of metrics associated with respective the video blocks of the coded unit that are predicted based respectively on each integer and sub-integer pixel location (122), and calculates a second set of metrics associated with each integer and sub-integer pixel location of the predictive video blocks used for such coding (123).

Motion compensation unit 35 calculates a plurality of offset values based on the first and second sets of metrics (124). The first and second sets of metrics may comprise mean values, and the offset values may comprise differences between such mean values. In any case, motion compensation unit 35 applies the offset values to the predictive video blocks to generate offset predictive video blocks (125). Video encoder 60 then encodes the video blocks of the coded unit in a second coding pass based on the offset predictive video blocks (126), e.g., by invoking adder 48 to subtract the offset predictive video blocks from the video blocks of the coded unit being coded. In addition, entropy coding unit 46 encodes the offset values (127). In particular, entropy coding unit 46 may entropy encode the offset values as part of a coded bitstream that includes the coded video blocks of the coded unit. The encoded bitstream may then be transmitted to another device (128). In particular, the bitstream may be modulated by modem 23 (FIG. 1) and transmitted to destination device 16 via transmitter 24 (105).

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, etc.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of encoding video data, the method comprising:
   calculating a plurality of different DC offset values for a coded unit of the video data, wherein the plurality of different DC offset values are associated with a plurality of different integer and sub-integer pixel locations, wherein the different DC offset values include one DC offset value for integer pixel locations and several DC offset values for different sub-integer pixel locations;
   applying the DC offset values to predictive video blocks to bias the predictive video blocks according to the DC offset values and thereby generate offset predictive video blocks;
   encoding video blocks of the coded unit based on the offset predictive video blocks.

2. The method of claim 1, further comprising encoding the DC offset values as part of a coded bitstream that includes the coded video blocks of the coded unit.

3. The method of claim 2, wherein encoding the DC offset values comprises for each of the DC offset values assigning a first number of bits to an integer portion of a given DC offset value and assigning a second number of bits to a fractional portion of the given DC offset value, wherein the first and second numbers of bits are determined based on a magnitude of the integer portion.

4. The method of claim 3, further comprising encoding the first number of bits differently than the second number of bits.

5. The method of claim 2, further comprising transmitting the coded bitstream from a source device to a destination device.

6. The method of claim 1, wherein the coded unit comprises one of a video frame and a slice of a video frame.

7. The method of claim 1, wherein the DC offset values include fifteen different DC offset values for fifteen different sub-integer pixel locations.

8. The method of claim 1, wherein calculating the plurality of DC offset values includes:
   calculating a first set of metrics associated with respective video blocks of the coded unit that are encoded based on the predictive video blocks at each integer and sub-integer pixel location;
   calculating a second set of metrics associated with each integer and sub-integer pixel location for the predictive video blocks; and
   calculating the plurality of DC offset values based on the first and second sets of metrics.

9. The method of claim 8, wherein:
   the first set of metrics comprise a first set of mean values associated with the respective video blocks of the coded unit that are coded based on the predictive video blocks at each integer and sub-integer pixel location;
   the second set of metrics comprise a second set of mean values associated with each integer and sub-integer pixel location for the predictive video blocks; and
   the plurality of DC offset values comprise differences between the first set of mean values and the second set of mean values.

10. The method of claim 1, further comprising re-calculating the plurality of DC offset values for different coded units of the video data.

11. A method of decoding video data, the method comprising:
   receiving a plurality of different DC offset values for a coded unit of the video data, wherein the plurality of different DC offset values are associated with a plurality of different integer and sub-integer pixel locations, wherein the different DC offset values include one DC offset value for integer pixel locations and several DC offset values for different sub-integer pixel locations;

applying the DC offset values to predictive video blocks to bias the predictive video blocks according to the DC offset values and thereby generate offset predictive video blocks;

decoding video blocks of the coded unit based on the offset predictive video blocks.

12. The method of claim 11, wherein the coded unit comprises one of a video frame and a slice of a video frame.

13. The method of claim 11, wherein the DC offset values include fifteen different DC offset values for fifteen different sub-integer pixel locations.

14. The method of claim 11, wherein the DC offset values comprise differences between a first set of mean values associated with respective video blocks of the coded unit that were encoded based on the predictive video blocks at each integer and sub-integer pixel location, and a second set of mean values associated with each integer and sub-integer pixel location for the predictive video blocks.

15. The method of claim 11, wherein the method is repeated for different coded units of the video data.

16. An apparatus that encodes video data, the apparatus comprising a video encoder that:
calculates a plurality of different DC offset values for a coded unit of the video data, wherein the plurality of different DC offset values are associated with a plurality of different integer and sub-integer pixel locations, wherein the different DC offset values include one DC offset value for integer pixel locations and several DC offset values for different sub-integer pixel locations;
applies the DC offset values to predictive video blocks to bias the predictive video blocks according to the DC offset values and thereby generate offset predictive video blocks; and
encodes video blocks of the coded unit based on the offset predictive video blocks.

17. The apparatus of claim 16, wherein the video encoder includes an entropy coding unit that encodes the DC offset values as part of a coded bitstream that includes the coded video blocks of the coded unit.

18. The apparatus of claim 16, wherein the video encoder includes a quantization unit that, for each of the DC offset values, assigns a first number of bits to an integer portion of a given DC offset value and assigns a second number of bits to a sub-integer portion of the given DC offset value, wherein the first and second numbers of bits are determined based on a magnitude of the integer portion.

19. The apparatus of claim 18, wherein the video encoder encodes the first number of bits differently than the second number of bits.

20. The apparatus of claim 16, wherein the coded unit comprises one of a video frame and a slice of a video frame.

21. The apparatus of claim 16, wherein the DC offset values include fifteen different DC offset values for fifteen different sub-integer pixel locations.

22. The apparatus of claim 16, wherein the video encoder:
calculates a first set of metrics associated with respective video blocks of the coded unit that are encoded based on the predictive video blocks at each integer and sub-integer pixel location;
calculates a second set of metrics associated with each integer and sub-integer pixel location for the predictive video blocks; and
calculates the plurality of DC offset values based on the first and second sets of metrics.

23. The apparatus of claim 22, wherein:
the first of metrics comprise a first set of mean values associated with the respective video blocks of the coded unit that are coded based on the predictive video blocks at each integer and sub-integer pixel location;
the second set of metrics comprise a second set of mean values associated with each integer and sub-integer pixel location for the predictive video blocks; and
the plurality of DC offset values comprise differences between the first set of mean values and the second set of mean values.

24. The apparatus of claim 16, wherein the video encoder re-calculates the DC offset values for different coded units of the video data.

25. The apparatus of claim 16, wherein the apparatus comprises an integrated circuit.

26. The apparatus of claim 16, wherein the apparatus comprises a microprocessor.

27. The apparatus of claim 16, further comprising a wireless transmitter that sends a coded bitstream to another device, wherein the coded bitstream includes the plurality of DC offset values, and wherein the apparatus comprises a wireless communication handset.

28. An apparatus that decodes video data, the apparatus comprising a video decoder that:
receives a plurality of different DC offset values for a coded unit of the video data, wherein the plurality of different DC offset values are associated with a plurality of different integer and sub-integer pixel locations, wherein the different DC offset values include one DC offset value for integer pixel locations and several DC offset values for different sub-integer pixel locations;
applies the DC offset values to predictive video blocks to bias the predictive video blocks according to the DC offset values and thereby generate offset predictive video blocks; and
decodes video blocks of the coded unit based on the offset predictive video blocks.

29. The apparatus of claim 28, wherein the coded unit comprises one of a video frame and a slice of a video frame.

30. The apparatus of claim 28, wherein the DC offset values include fifteen different DC offset values for fifteen different sub-integer pixel locations.

31. The apparatus of claim 28, wherein the DC offset values comprise differences between a first set of mean values associated with respective video blocks of the coded unit that were encoded based on the predictive video blocks at each integer and sub-integer pixel location, and a second set of mean values associated with each integer and sub-integer pixel location for the predictive video blocks.

32. The apparatus of claim 28, wherein the video decoder receives and applies different pluralities of DC offset values for different coded units of the video data.

33. The apparatus of claim 28, wherein the apparatus comprises an integrated circuit.

34. The apparatus of claim 28, wherein the apparatus comprises a microprocessor.

35. The apparatus of claim 28, further comprising a wireless receiver that receives a coded bitstream from another device, wherein the coded bitstream includes the plurality of DC offset values, and wherein the apparatus comprises a wireless communication handset.

36. A non-transitory computer-readable medium comprising instructions that upon execution cause a device to encode video data, wherein the instructions cause the device to:
calculate a plurality of different DC offset values for a coded unit of the video data, wherein the plurality of different DC offset values are associated with a plurality of different integer and sub-integer pixel locations, wherein the different DC offset values include one DC offset value for integer pixel locations and several DC offset values for different sub-integer pixel locations;

apply the DC offset values to predictive video blocks to bias the predictive video blocks according to the DC offset values and thereby generate offset predictive video blocks; and encode video blocks of the coded unit based on the offset predictive video blocks.

37. A non-transitory computer-readable medium comprising instructions that upon execution cause a device to decode video data, wherein the instructions cause the device to:

receive a plurality of different DC offset values for a coded unit of the video data, wherein the plurality of different DC offset values are associated with a plurality of different integer and sub-integer pixel locations;

apply the DC offset values to predictive video blocks to bias the predictive video blocks according to the DC offset values and thereby generate offset predictive video blocks, wherein the different DC offset values include one DC offset value for integer pixel locations and several DC offset values for different sub-integer pixel locations; and decode video blocks of the coded unit based on the offset predictive video blocks.

38. A device that encodes video data, the device comprising:

means for calculating a plurality of different DC offset values for a coded unit of the video data, wherein the plurality of different DC offset values are associated with a plurality of different integer and sub-integer pixel locations, wherein the different DC offset values include one DC offset value for integer pixel locations and several DC offset values for different sub-integer pixel locations;

means for applying the DC offset values to predictive video blocks to bias the predictive video blocks according to the DC offset values and thereby generate offset predictive video blocks; and means for encoding video blocks of the coded unit based on the offset predictive video blocks.

39. A device that decodes video data, the device comprising:

means for receiving a plurality of different DC offset values for a coded unit of the video data, wherein the plurality of different DC offset values are associated with a plurality of different integer and sub-integer pixel locations;

means for applying the DC offset values to predictive video blocks to bias the predictive video blocks according to the DC offset values and thereby generate offset predictive video blocks, wherein the different DC offset values include one DC offset value for integer pixel locations and several DC offset values for different sub-integer pixel locations; and means for decoding video blocks of the coded unit based on the offset predictive video blocks.

* * * * *